United States Patent
Sharpe

(10) Patent No.: US 8,281,351 B2
(45) Date of Patent: Oct. 2, 2012

(54) SYSTEM, METHOD, AND COMPUTER READABLE MEDIUM RAPID CHANNEL CHANGE

(75) Inventor: Randall B. Sharpe, Chapel Hill, NC (US)

(73) Assignee: Alcatel Lucent, Paris (FR)

( * ) Notice: Subject to any disclaimer, the term of this patent is extended or adjusted under 35 U.S.C. 154(b) by 1152 days.

(21) Appl. No.: 11/315,551

(22) Filed: Dec. 22, 2005

(65) Prior Publication Data

US 2006/0245444 A1 Nov. 2, 2006

Related U.S. Application Data

(60) Provisional application No. 60/676,480, filed on Apr. 29, 2005.

(51) Int. Cl.
*H04N 7/173* (2011.01)
(52) U.S. Cl. .......................................... 725/94; 725/116
(58) Field of Classification Search .............. 725/1–153; 375/240.27, 240; 370/412
See application file for complete search history.

(56) References Cited

U.S. PATENT DOCUMENTS

| | | | | |
|---|---|---|---|---|
| 5,588,029 | A * | 12/1996 | Maturi et al. | 375/364 |
| 6,330,286 | B1 * | 12/2001 | Lyons et al. | 375/240.28 |
| 6,445,742 | B1 * | 9/2002 | Yoo et al. | 375/240.27 |
| 6,512,795 | B1 * | 1/2003 | Zhang et al. | 375/240.27 |
| 6,785,401 | B2 * | 8/2004 | Walker et al. | 382/100 |
| 7,430,222 | B2 * | 9/2008 | Green et al. | 370/486 |
| 7,523,482 | B2 * | 4/2009 | Barrett et al. | 725/120 |
| 2002/0143852 | A1 | 10/2002 | Guo et al. | |
| 2003/0033569 | A1 * | 2/2003 | Klein Middelink et al. | 714/751 |
| 2004/0062274 | A1 * | 4/2004 | Hakansson et al. | 370/468 |
| 2004/0255328 | A1 * | 12/2004 | Baldwin et al. | 725/90 |
| 2005/0081244 | A1 * | 4/2005 | Barrett et al. | 725/97 |
| 2006/0020995 | A1 * | 1/2006 | Opie et al. | 725/117 |
| 2006/0075428 | A1 * | 4/2006 | Farmer et al. | 725/38 |
| 2006/0143669 | A1 * | 6/2006 | Cohen | 725/90 |
| 2007/0107026 | A1 * | 5/2007 | Sherer et al. | 725/97 |

FOREIGN PATENT DOCUMENTS

| | | |
|---|---|---|
| EP | 1133111 A2 | 9/2001 |
| WO | 02087235 A1 | 10/2002 |
| WO | 03071783 A1 | 8/2003 |
| WO | 2004039034 A1 | 5/2004 |

OTHER PUBLICATIONS

Kuo, et al.; Fast Global Motion-Compensated Frame interpolator for Very Low-Bit-Rate Video Quality Enhancement; 2003 IEEE International Conference on Acoustics, Speech and Signal Processing (ICASSP '03); Apr. 6-10, 2003; pp. 111-116; vol. 3.

* cited by examiner

*Primary Examiner* — Brian Pendleton
*Assistant Examiner* — Jean D Saint Cyr
(74) *Attorney, Agent, or Firm* — RG & Associates

(57) ABSTRACT

A system, method and computer readable medium operable to move a video delay from a network video queue to a decoder video queue by discarding at least one video frame in a network video queue, thus moving video frames deeper in the queue forward in time. As such, rapid channel changing is provided without continuous unicasting, or temporarily transmitting at faster than the nominal rate, thereby alleviating strain on the network.

16 Claims, 1 Drawing Sheet

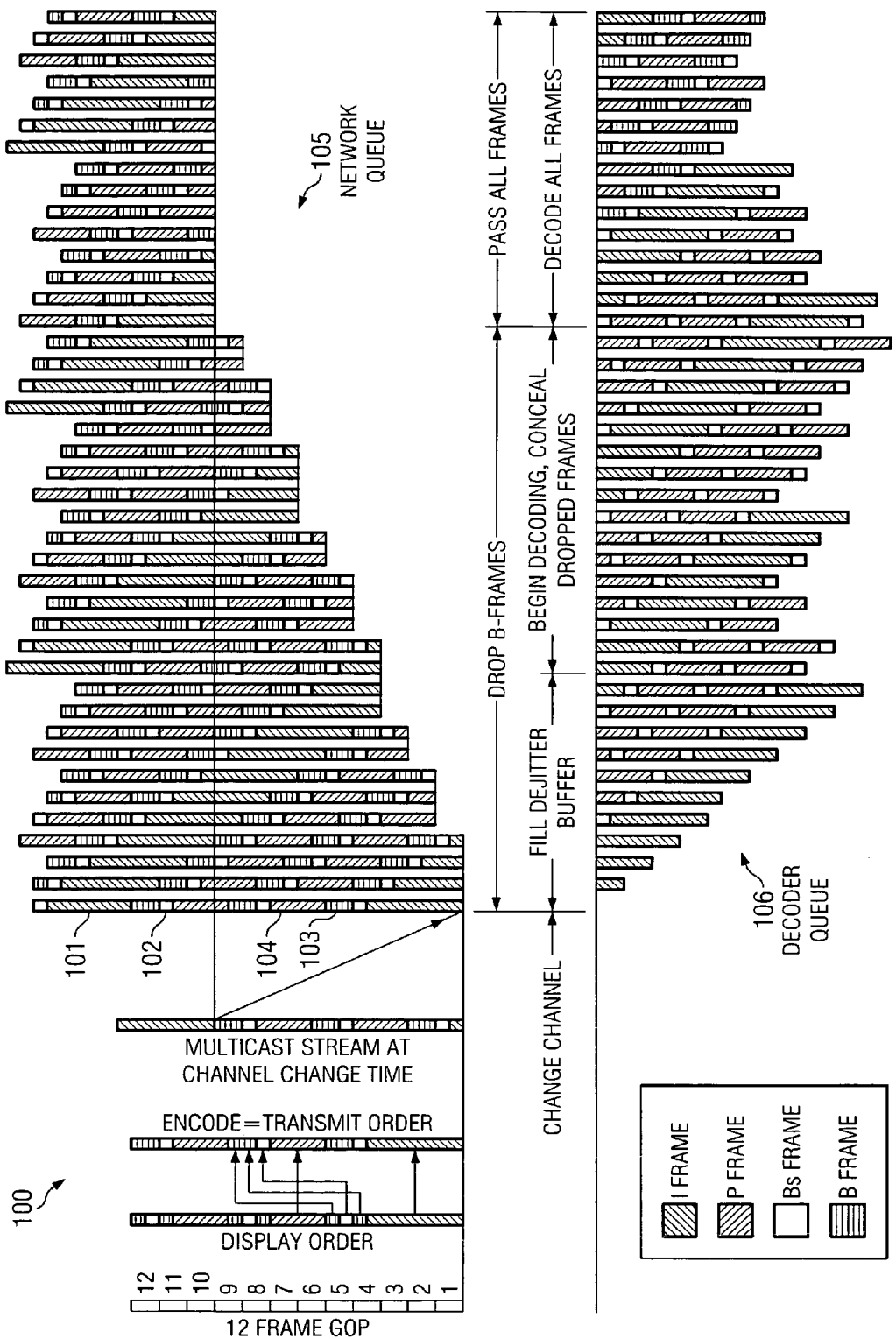

SYSTEM, METHOD, AND COMPUTER READABLE MEDIUM RAPID CHANNEL CHANGE

CROSS REFERENCE TO RELATED APPLICATION

This application claims the benefit of U.S. Provisional Application No. 60/676,480 filed on Apr. 29, 2005, entitled "B-Frame Discarding For Rapid Channel Change," under 35 U.S.C. Section 119(e), the entire contents of which are enclosed by reference herein.

STATEMENT REGARDING FEDERALLY SPONSORED RESEARCH OR DEVELOPMENT

This invention was made under the support of the United States Government, Department of Commerce, National Institute of Standards and Technology (NIST), Award Number 70NANB3H3053. The United States Government has certain rights in the invention.

TECHNICAL FIELD OF THE INVENTION

The present invention relates to a system, method and computer readable medium of accomplishing rapid channel changes in a switched digital video network.

BACKGROUND OF THE INVENTION

A conventional method for accomplishing a rapid channel change in a switched digital video network includes streaming beginning at a most recent I-Frame upon receipt of a channel change request by a device in the network. An I-Frame is the first frame in a Group of Pictures ("GOP") and can be decoded without information from any other decoded video frame. Since a GOP period may be 2 or more seconds, the decoder may disadvantageously begin to receive video that occurred a few seconds in the past. Since the channel change times of viewers are not simultaneous, each viewer will receive a unicast stream based on the location of the I-Frame in the queue on the network device at the time of the channel change request. In order for the decoder to join a multicast stream for the same channel without skipping forward in time, the delay in the network device must be transferred to a delay in the decoder. When all of the delay is in the decoder, then the multicast stream can be joined. The viewer will still see content that may be a few seconds old but this is typically not of consequence to a broadcast video service.

Transferring the delay from the network device to the decoder while simultaneously streaming the video requires the network device to transmit at a faster than normal rate for a period of time. As an example, if a viewer selects a 6 Mbps HDTV program and the most recent I-Frame occurred 2 seconds ago, and further, if the network device is configured to transmit one third faster following a channel change request, then the overall rate is 6*1.33=8 Mbps. To transfer 2 seconds of HDTV delay to the decoder will take 2/0.33=6 seconds.

The capacity of a Digital Subscriber Line ("DSL") channel is limited. Engineering a network to support rapid channel change as described above requires several Mbps of reserved bandwidth. Such a configuration will either reduce the DSL serving area, reduce the number of video streams that can be delivered, and/or compromise other services during channel changing periods.

A conventional method of rapid channel change consists of temporarily transmitting the video stream at a greater than normal rate as described above. This method is not effective in that additional capacity is required on the DSL line to accommodate rapid channel changes which will either reduce the DSL serving area, reduce the number of video streams allowed, or compromise other services. Therefore, what is desired is an effective system, method, and computer readable medium (or software) to support a rapid channel change in a switched digital video network without, among other things, the need to increase DSL line capacity.

SUMMARY OF THE INVENTION

The present invention comprises a system, method, and computer readable medium to move video delay from the network to the decoder by intelligently discarding video frames in the network device video queue. As such, video frames deeper in the queue are moved forward in time. The present invention takes advantage of the decoder's ability to conceal discarded video frames by repeating previous frames or by using more sophisticated techniques. For example, the decoder continues to display the last good frame (frame repeat). Alternatively, the decoder could display what the missing frame was predicted to be. Compression is based on sending the difference between a prediction and the actual frame so the prediction is available in the decoder.

BRIEF DESCRIPTION OF THE DRAWINGS

FIG. 1 an illustration of a GOP containing 12 video frames in accordance with a preferred embodiment of the present invention.

DETAILED DESCRIPTION OF PREFERRED EMBODIMENTS

The present invention comprises the moving of video delay from a network device to a decoder by intelligently discarding video frames in the network service video queues, thus moving video frames deeper in the queue forward in time. Such a process takes advantage of the decoder's ability to conceal discarded video frames by repeating previous frames or using more sophisticated techniques.

For example, assume a video stream where every 2nd video frame is a B-Frame. A B-Frame is a frame that is not used as a reference for any other frame so discarding a B-Frame will not cause persistent video artifacts. Using simple frame repeating for loss concealment, the consequence of temporarily dropping B-Frames following a channel change will be a reduction in temporal resolution by 50% causing motion to appear less smooth. For conventional 30 frames per second TV, the viewer would temporarily see 15 frames per second. For 60 frames per second HDTV, the viewer would temporarily see 30 frames per second.

Assuming B-Frames make up 25% of the encoded video bits and at the moment of a channel change request the most recent I-Frame is 2 seconds old, then the period of reduced temporal resolution would be about 2/0.25=8 seconds.

The system of the present invention comprises a number of elements as described below. An access network is the part of a telecommunications network between the central office and a home or business. An access node is a device on the network side of the access network that terminates the connections from a group of homes. For DSL networks, the access node is called a DSLAM and the connections are DSL. For optical access networks the access node is an OLT and the connection is a PON. An access node containing the functionality described in the present patent application receives a number of video streams from a source (head end) in the network and provides the selected video streams to decoders within homes. The access node also delivers voice and data services to homes. The access node could be connected directly to the decoder (when the DSL modem is integrated into a set top box) but more generally the access network terminates at each home (DSL modem or residential gateway for DSL, ONT for optical access networks) and the modem/RG/ONT connect to set top boxes containing the decoders.

As such, a representative network of the present invention could have an access node receiving a number of video streams, connected to a RG in each home connected to several decoders. When a viewer requests a different video stream (TV channel) the decoder sends a message to a network device (which could be the access node) which causes it to send a unicast stream starting at the most recent GOP boundary. The stream goes across the access network and is forwarded to the proper decoder by the RG. The access node includes a network interface to receive the video stream, a circular buffer to contain the most recent seconds of each available stream, a customer facing interface, a digital processing device and associated memory. The memory contains the code that controls writing into and reading from the circular buffer and includes pointers to GOP boundaries.

Referring now to FIG. 1, a GOP 100 containing 12 video frames is depicted. As seen therein, the first frame 101 in the GOP 100 is an I-Frame which is a reference for all other encoded frames in the GOP 100. A GOP 100 cannot begin to be decoded until an I-Frame arrives. An I-Frame generally requires more bits to encode than any other frame in the GOP 100 so the block 101 is larger than the other blocks. The blocks 104, which are P-Frames, are the encoded difference between a prediction of what the frame is expected to be based upon a single previously decoded frame and what it actually is. P-Frames generally require fewer bits to encode than I-Frames. The blocks 102 are Bs-Frames, which are frames that are based on a bidirectional prediction, using both a preceding frame and a following frame. Bidirectional prediction is making a prediction based on two frames, generally one earlier and one later in time than the frame being predicted. This can be accomplished since frames are not always transmitted in the same sequence that they are displayed. So information of what the previous frame was and what the next frame will be is known and used to predict the B and Bs frames. This prediction should be very good so little information needs to be sent from the encoder to the decoder to correct the prediction error. The blocks 103 are B-Frames which also use bidirectional prediction. The difference between Bs-Frames and B-Frames is that Bs-Frames may be used in predictions of other frames and therefore must be stored. B-Frames are not used in predictions and are therefore disposable without propagating artifacts.

The assumed GOP structure in display order is I B Bs B P B Bs B P B Bs B P B Bs B. As can be seen, every second frame is a B-Frame. The I-Frame is encoded first. Then the first P-Frame is encoded based on a prediction from a decoded I-Frame. Next the Bs-Frame is encoded based on a prediction from a decoded I and P-Frame. Then the first B-Frame is encoded based on a prediction from the decoded I and Bs-Frames. As such, the encoding order, which is the same as the transmission order is different from the display order. This is also shown on the left side of FIG. 1. Other GOP structures can be used with the present invention.

The top half 105 of FIG. 1 represents the occupancy of queues in the network. The queues fill at the top and drain at the bottom. The bottom half 106 of FIG. 2 represents the occupancy of the decoder queues. These queues also fill at the top and are drained at the bottom. A network exists between the top queue and the bottom queue. The top queue is in the access node and the bottom queue is in the decoder. The network may consist of a DSLAM (access node for DSL access networks) connected to a residential gateway over a DSL line. The RG connects to set-top boxes containing decoders.

Time advances left to right in steps of a video frame period (i.e. 1/30 of a second). In each period packets are transferred from the network queue 105, across the network, and into the decoder queue 106 at a constant bit rate corresponding to the average encoded video rate. Following a channel change, a unicast stream is started from the most recent I-Frame in the queue. FIG. 1 shows the unicast queue with the I-Frame at the head of the queue immediately after the channel change. The unicast stream actually starts from a point of time in the past corresponding to the time at which the I-Frame arrived in the queue.

In the network device (top queues), an encoded frame of varying size enters every frame period and the queue is drained at a constant rate. Therefore the occupancy of the queue varies. Following a channel change, whenever a B-Frame is at the head of the queue, it gets discarded and other packets further back in the queue move forward in time. This will continue until the delay in the unicast network queue is eliminated to synchronize with the multicast stream. When this occurs, the network device can send all frames, including the B-Frames.

Decoders are designed to tolerate packet loss and generally have packet loss concealment capabilities. Decoders will not have to be enhanced or otherwise changed to be compatible with the present invention. When a decoder finds that a frame has not arrived (in this case a B-Frame) it will conceal the missing frame. The decoder will extract frames from the decoder dejitter queue when they are needed to be decoded to satisfy a display time. Referring again to FIG. 1, packets arrive at the decoder queue 106 at a constant rate corresponding to the average encoded video rate. A frame is extracted from the queue when it is needed by the decoder as determined by the display time. As is further seen in FIG. 1, a frame is extracted every 2nd frame period. Since the queue is filled at a constant rate and drained at a variable rate, the queue occupancy varies. When the unicast stream in the network device is brought into alignment with the multicast stream then the decoder will begin to receive all frames, including the B-Frames. The decoder will determine that the B-Frames are available and will use them instead of concealing their absence.

Rapid channel change can be achieved without bursting the video stream at faster than the nominal rate. In the example of existing practice, an HDTV channel change requires the network to transmit an additional 2-Mbps for a period of 6 seconds.

The present invention also simplifies the control of channel changes. The network will know when the unicast flow has reached alignment with the multicast flow and can begin sending B-Frames without any coordination with the decoder. Other schemes rely on knowledge that only the decoder has and requires additional messaging to indicate when to transition from a unicast stream to a multicast stream.

The system, methods, and computer readable media used to implement the present invention are only exemplary. Even though several characteristics and advantages of the present invention have been set forth in the foregoing description together with details of the methods of the invention, the disclosure is illustrative only and changes may be made within the principles of the invention to the full extent indicated by the broad general meaning of the terms used in the attached claims.

What is claimed is:

1. A method for rapid channel change, comprising:
   accessing a network video queue from a telecommunication network via a first node;
   receiving the network video queue via an access node, the access node including a buffer memory to distinguish the network video queue boundaries;
   transferring packets from the network video queue into a decoder video queue at a constant bit rate and a variable bit rate;
   discarding a video frame at a top position of the network video queue in response to a channel change operation, and wherein the video frame is discarded only if the video frame at the top position of the network video queue is a B-frame;
   concealing the discarded video frame; and
   moving video frames forward in time from further back in the network video queue until a delay in the network video queue caused by the video frame being discarded is removed, at which time all remaining video frames including subsequent B-Frames in the network video queue are transmitted to the viewer.

2. The method of claim 1, wherein a frame replacing the discarded frame may be one of: an I-Frame, a Bs-Frame or a P-Frame.

3. The method of claim 1, further comprising extracting frames from a buffer based on a display time stamp.

4. The method of claim 3, wherein if one of the frames is missing, repeating a previously displayed frame.

5. The method of claim 1, for use in combination with at least one of: conventional television transmissions and high definition television transmissions.

6. A non-transitory computer readable storage medium, storing computer-readable instructions that, when executed by a computer cause a processor to perform:
   accessing a network video queue from a telecommunication network via a first processor;
   receiving the network video queue via a second processor, the second processor including at least a buffer memory to distinguish the network video queue boundaries;
   discarding a video frame at a top position of the network video queue in response to a channel change operation, and wherein the video frame is discarded only if the video frame at the top position of the network video queue is a B-frame;
   concealing the discarded video frame via a decoder that is communicably coupled to an access node;
   extracting video frames deeper in the network video queue using a decoder video queue; and
   moving video frames deeper in the network video queue forward in time when the video frames are needed to satisfy a display time until a delay in the network video queue caused by the video frame being discarded is removed, at which time all remaining video frames including subsequent B-Frames in the network video queue are transmitted to the viewer.

7. The non-transitory computer readable storage medium of claim 6, further comprising concealing the discarded video frame with previous video frames.

8. The non-transitory computer readable storage medium of claim 7, further comprising;
   entering the network video queue by an encoded frame of varying size every frame period; and
   draining the network video queue at a constant rate or a variable rate.

9. The non-transitory computer readable storage medium of claim 8, further comprising continuing the discarding, moving and concealing of missing video frames until a delay in a unicast network queue is eliminated to synchronize with a multicast stream.

10. The non-transitory computer readable storage medium of claim 8, further comprising sending all frames, including the B-Frames, by a network when the delay in a unicast network queue is eliminated.

11. A system for facilitating rapid channel change in a network video queue, comprising: at least one device operably configured to:
    access a video network queue from a telecommunication network via a first processor;
    receive the network video queue via a second processor, the second processor including at least an access node and a buffer memory to distinguish the network video queue boundaries;
    discard at least one video frame at a top position of the network video queue in response to a channel change operation, and wherein the video frame is discarded only if the video frame at the top position of the network video queue is a B-frame;
    conceal the discarded video frame; and
    wherein the at least one module is operable to replace the at least one discarded video frame with at least one previous video frame by moving video frames deeper in the network video queue forward in time when the video frames are needed to satisfy a display time until a delay in the network video queue caused by the video frame being discarded is removed, at which time all remaining video frames including subsequent B-Frames in the network video queue are transmitted to the viewer.

12. The system of claim 11, further comprising:
    a network having a network queue; and
    a decoder having a decoder queue.

13. The system of claim 12, wherein the decoder is operable to replace the discarded frame when it determines that the discarded frame has not arrived.

14. The system of claim 13, wherein the decoder further comprises:
    a decoder dejitter queue; and
    wherein the decoder is operable to extract a video frame from the decoder dejitter queue when the video frame is needed to be decoded to satisfy a display time.

15. The system of claim 11, wherein the at least one module is operable to conceal the discarding of a video frame potentially from: an I-Frame, a Bs-Frame or a P-Frame.

16. The system of claim 11, for use in combination with at least one of: conventional television transmissions and high definition television transmissions.

* * * * *